United States Patent [19]
Johnson et al.

[11] Patent Number: 5,187,806
[45] Date of Patent: Feb. 16, 1993

[54] APPARATUS AND METHOD FOR EXPANDING CELLULAR SYSTEM CAPACITY

[76] Inventors: Edward R. Johnson, 1658 Swallow Dr., Sunnyvale; Barry J. Leff, 2760 Belmont Canyon Rd., Belmont, both of Calif.

[21] Appl. No.: 482,226

[22] Filed: Feb. 16, 1990

[51] Int. Cl.$^5$ .................. H04B 7/14; H04Q 7/02; H04Q 9/00
[52] U.S. Cl. ........................................ 455/15; 455/22; 455/33.1; 455/56.1
[58] Field of Search ............... 455/9, 10, 15, 16, 20, 455/22, 33, 34, 53, 54, 56; 379/59, 60, 63; 370/26, 75

[56] References Cited

U.S. PATENT DOCUMENTS

| | | | |
|---|---|---|---|
| 4,128,740 | 12/1978 | Graziano | 179/2 |
| 4,144,411 | 3/1979 | Frenkiel | 179/2 |
| 4,704,733 | 11/1987 | Kawano | 455/33 |
| 4,718,081 | 1/1988 | Brenig | 455/33 |
| 4,718,108 | 1/1988 | Davidson et al. | 455/17 |
| 4,723,266 | 2/1988 | Perry | 379/60 |
| 4,727,590 | 2/1988 | Kawano et al. | 455/33 |
| 4,775,998 | 10/1988 | Felix et al. | 379/59 |
| 4,797,947 | 1/1989 | Labedz | 453/33 |
| 4,799,253 | 1/1989 | Stern et al. | 379/59 |
| 4,941,200 | 7/1990 | Leslie et al. | 455/17 |
| 4,972,346 | 11/1990 | Kawano et al. | 455/33 |
| 5,065,449 | 11/1991 | Gordon et al. | 455/33 |

Primary Examiner—Reinhard J. Eisenzopf
Assistant Examiner—Lisa D. Charouel

[57] ABSTRACT

In a cellular system, including at least one cell site located within a corresponding geographic sector, an apparatus and method provides for expanding cellular system capacity through subdivision of the geographic sector by use of a cell site transceiver and a remote site transceiver to extend said cell site to a remote location within said geographic sector. Each transceiver provides duplex operation and includes a cellular band transmitter and receiver portion for local communication with the cell site or remote site mobile units, as the case may be; and a link frequency transmitter and receiver portion for communicating cellular band information, after conversion to an appropriate baseband frequency, between the cell site and the remote site transceivers.

19 Claims, 6 Drawing Sheets

APPARATUS AND METHOD FOR EXPANDING CELLULAR SYSTEM CAPACITY

DESCRIPTION

1. Technical Field

The present invention relates to cellular telephone systems. More particularly, the present invention relates to an apparatus and method for expanding cellular system capacity.

2. Background Art

A cellular network allows mobile communications in a specified geographic area by dividing the area into sectors, each of which is serviced by a cell site dedicated to that particular sector. Cellular systems work because a low power mobile unit is passed from cell site to cell site as the unit moves about in the service area from sector to sector. During the passing off, the mobile unit may be assigned a different communication frequency, know as a channel, corresponding to the channels allocated to the cell site in the mobile unit's current sector. In this way, the frequency spectrum within a limited service area is reused. Thus, each channel within the system may be used at a plurality of cell sites simultaneously and the system can therefore support a number of users far in excess of channels and frequency spectrum otherwise available.

However, the unthinkable has happened. The wild success of cellular systems has created serious capacity problems in existing cellular networks. This lack of capacity results in busy signals when calling into an out of a cellular system. More significantly, such lack of capacity frequently results in a break in communications when a mobile unit passes into a sector in which the corresponding cell site is already operating at maximum load.

One solution is simply to continue adding cell sites. This solution is economically undesirable when the capital cost of establishing a cell site, a prohibitive $400,000.00 to $500,000.00 on the average, is taken into consideration. Siting may not even be available within the sector for the physical plant that contains the cell site. Such schemes are shown in U.S. Pat. Nos. 4,775,998, Felix et al (collocating cell sites within a sector) and 4,144,411 Frenkiel (adding small cell sites to a large cell site within a sector).

Various complicated schemes for extending the range of a cellular system are shown in the prior art. U.S. Pat. No. 4,727,590, Kawano et al, shows a scheme for reducing transmission power levels required at the mobile unit by extending the cell site's receiver to locations remote from the cell site through the use of one way repeaters that establish a link between the cell site and antennas placed remotely from the cell site within the sector. While a reduction in transmitter power allows the production of smaller mobile units and might also reduce interference between sectors in the cellular system, the capacity problem is not addressed.

Other interesting (but not, however, helpful) schemes are shown in U.S. Pat. Nos. 4,718,108, Davidson et al (repeaters used as a relay station to convert signals in a first sector to those in a second sector and thus extend the range of a cell site to remote locations); 4,128,740 Graziano (antenna array); 4,723.266 Perry (sharing control channels in collocated cell sites having a plurality of receivers, for different voice channels); 4,799,253, Stern et al (two cellular services sharing resources); and 4,797,947 Labedz (time division multiplexing signals received from a plurality of radiators to determine optimum transmission path).

Thus, while there is significant teaching toward extending the range of a cellular system, other than adding expensive cell sites, there has heretofore been no teaching toward expanding the capacity of a mature cellular system in a simple and economical manner.

SUMMARY OF THE INVENTION

The present invention provides an apparatus and method for expanding cellular system capacity in a cellular system that includes a least one cell site located in a corresponding geographic sector. Capacity is enhanced by providing a remote site within the geographic sector that includes the corresponding cell site. Rather than accomplish subdivision of the geographic sector by establishing another cell site, the remote site provides a communications link with the cell site and, in effect, extends the cell site to the remote location.

In an illustrative embodiment of the invention, the cell site and the remote site each include a duplex transceiver. Each transceiver includes a means for sending and receiving at a link frequency. The remote site may include diversity reception of mobile signals in various embodiments of the invention. In various embodiments of the invention, the link frequency may be in the microwave or other communications band and is the medium over which the cell site and remote site communication one with the other.

Each transceiver includes means for converting the link frequency signals to cellular band signals and vice versa. In one embodiment of the invention, the cellular band and link frequency signals are first converted to a baseband signal to improve signal-to-noise ratios and simplify construction and cost of the device. A pilot signal may also be included in one or both of the transceivers which, when decoded by the other transceiver, provides for accurate synchronization and registration of the two transceivers and thus avoids transmission errors.

In other embodiments of the invention, the cellular band channels assigned to the cell site are allocated between the cell site and the remote site such that the remote site has the appearance of an additional cell site to the cellular system. In this way, a sector may be subdivided and (by the use of additional remote site transceivers) subdivided again.

Such subdivision significantly increases the capacity of the cellular system. The present invention accomplishes such subdivision at minimal cost without necessitating the need to add cell sites, although, at the same time, provides what is, in effect, the functionality of additional cell sites.

DISCLOSURE OF THE INVENTION

The present invention is best understood by referring to the drawings in connection with review of this disclosure.

Figure 1:
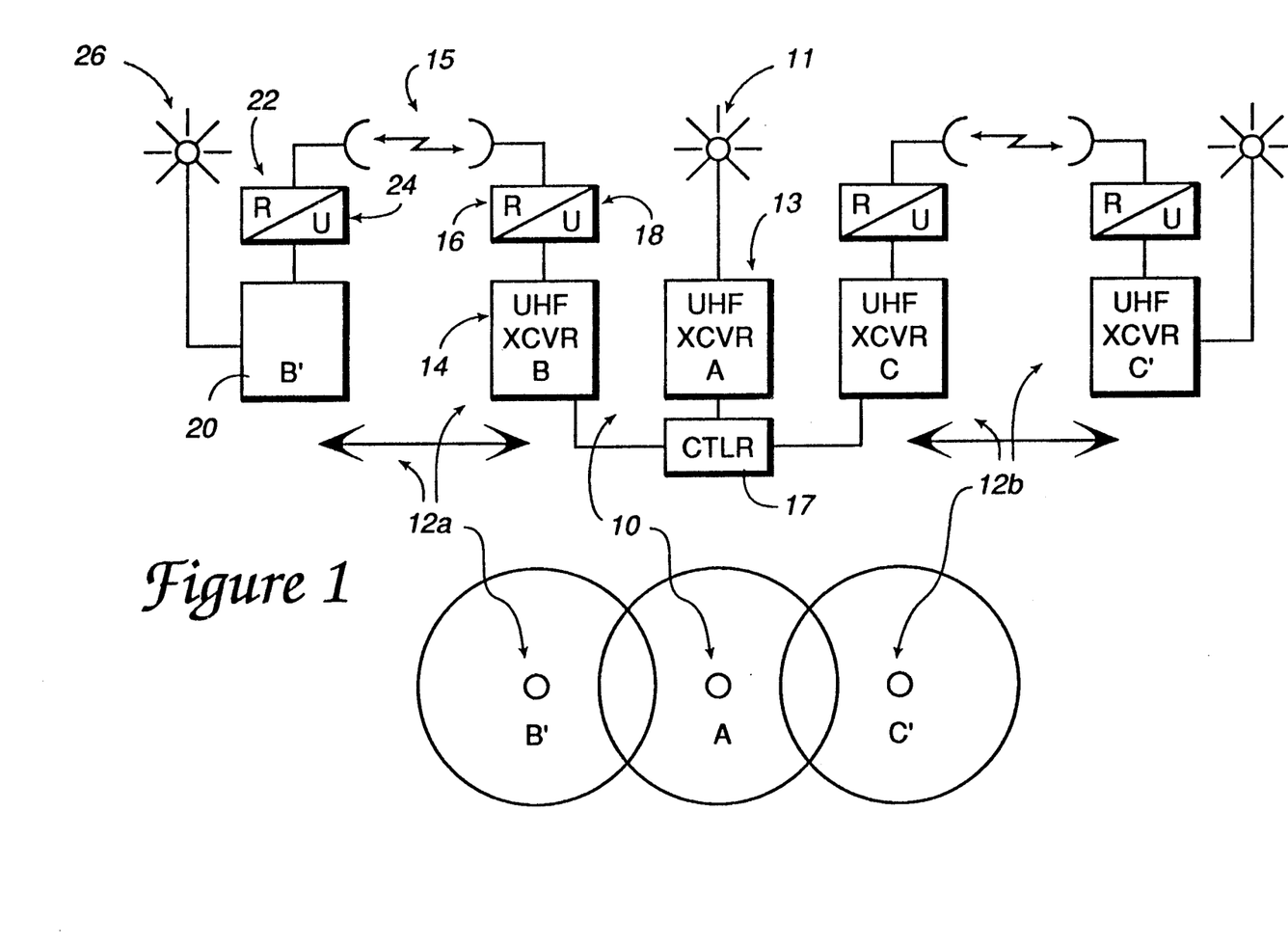
FIG. 1 is a block level diagram of a cellular system cell site incorporating an illustrative embodiment of the present invention.

The present invention is designed as an economical way to expand cellular system capacity. The invention can be installed at a much smaller (and less expensive) location than that of a complete cell site. Referring to FIG. 1, a cell site 10 (serving a geographic sector designated as "A") is shown including a master cell site transceiver 13 connected to an antenna 11 systems (which may include separate transmit and receive antennas) and operating under control of controller 17. This is simply a standard cell site developed with all of the accompanying infrastructure, hardware, etc..

Master cell site 13 is extended to geographic sectors "B'" and "C'" through use of the present invention which consists of "mini-cell sites" 12a and 12b. It will be recognized that the number of mini-cell sites included is a matter of need and choice. A conventional cell site can be used to support any number of mini-cell sites. Accordingly, for purposes of discussing the present invention, only mini-cell site 12a is discussed herein.

A typical mini-cell site can be configured with any number of channels, as allocated by controller 17. The present invention is configurable with 4-16 channels and operates within a range of 1-2 miles. Range of operation and number of channels is a function of transmitter power, and is thus a matter of choice. Antenna selection and siting is also a matter of choice. For example omnidirectional or directional antennas may be used. Additionally, as is discussed below, diversity reception may be provided.

Mini-cell site 12a includes a cell site transceiver portion 14 located proximate to, e.g. within the same physical plant (or as otherwise desired), the master cell site equipment. Up and down conversion stage 18 and microwave transceiver stage 16 couple transceiver 14 to a remote transceiver portion 20 by means of a wireless link 15 (including appropriate antennas). Corresponding microwave transceiver stage 22 and up and down conversion stage 24 at transceiver 20 complete the linkage of transceiver 20 to transceiver 14. An antenna 26 located at remote transceiver 20 allows reception and propagation of cellular signals within the divided portion "B'" of the geographic sector assigned to master cell site transceiver 13.

The remote site transceivers have equipment that is vastly simplified from that of a typical cell site: no cell site controllers (the controller is shared at the master cell site), no bulky combiners, simplified installation, full duplex antennas, etc. The remote site equipment is similar to that of a cellular repeater or enhancer, but rather than simply forwarding signals back and forth to the master cell site, the present invention establishes a discrete geographic territory within a particular sector and thus subdivides the reusable spectrum, allowing increased cellular system capacity. There are no constraints on which channels the remote transceiver is assigned, except that interference be avoided and that the frequency plan be followed. For example, it could appear as a "sector" of the cell to the cellular system.

Figure 2:
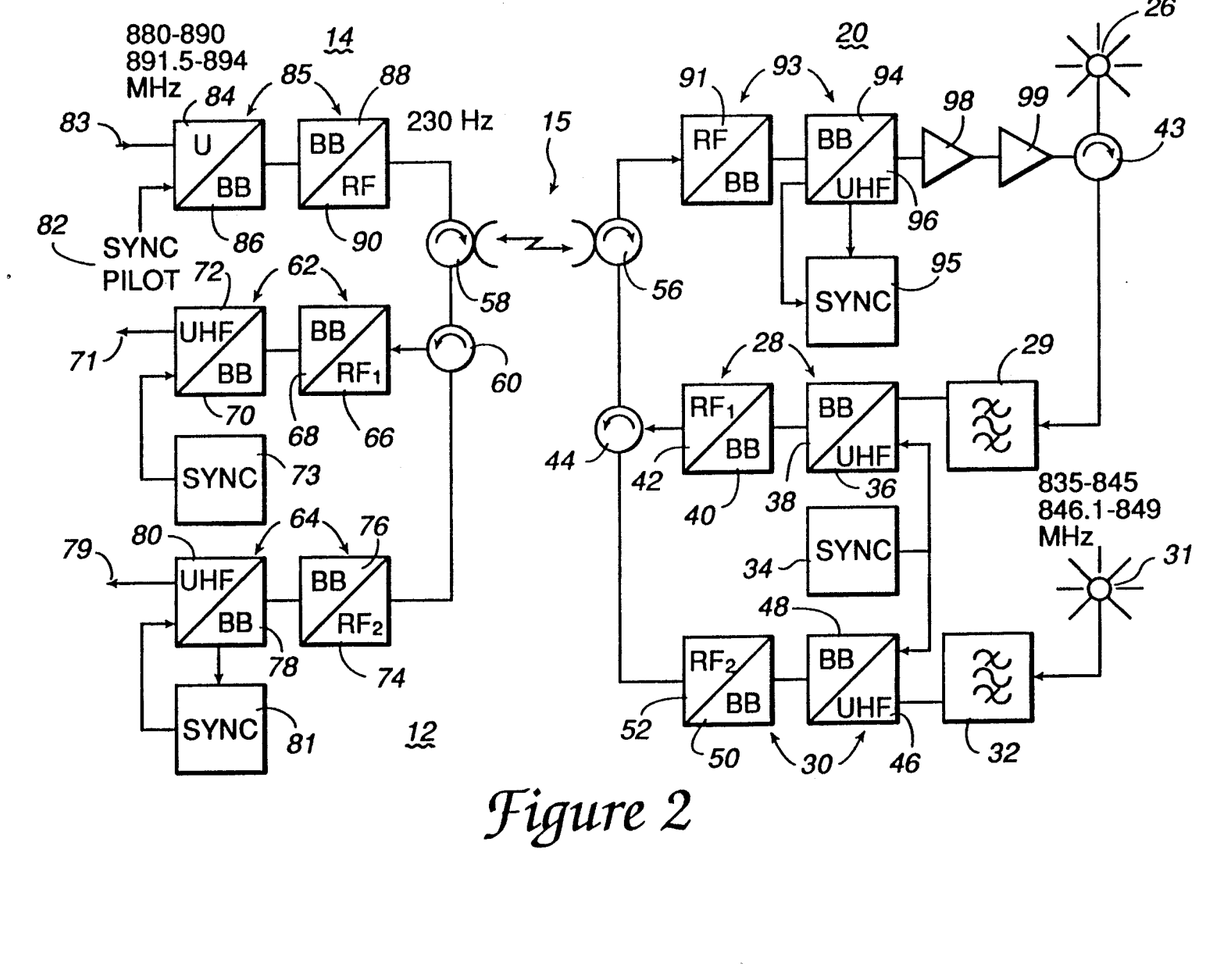
FIG. 2 is a block level diagram of an illustrative embodiment of the present invention.

In the invention, the entire 12.5 MHz "B" band cellular spectrum is converted to a baseband signal (as is discussed more fully in connection with the description of FIG. 2) which, in one embodiment of the present invention, is in the 0-15 MHz portion of the radio frequency spectrum. A significant feature of the present invention is the use of a baseband intermediate stage within the signal processing path. This approach is preferred over directly modulating the cellular spectrum to a microwave frequency such as 23 GHz for several reasons. For example, this approach uses existing technology which simplifies both development and manufacture. Local oscillators and amplifiers in the 23 GHz range are expensive. By modulating all of the cellular channels onto a single carrier a high power linear 23 GHz power amplifier is not needed to provide adequate fade margins and intermodulation problems inherent in multiple carriers are avoided.

The baseband signal is, in turn, modulated onto a standard 23 GHz FM microwave radio. This forms link 15. The link could be established at other frequencies as appropriate and such variation is contemplated as being desirable, for example, where several services compete within a market and interference must be avoided. The up and down conversion equipment can also be readily adapted to other bands as required and/or appropriate.

Referring to FIG. 2, the present invention 12 is shown including cell site transceiver 14 and remote site transceiver 20. Starting with remote site transceiver 20, signals are received at antenna 26 which correspond to a cellular transmission either within a geographic area remote from the cell site (and therefore not serviced by the cell site) and/or a subset of the area otherwise covered by the cell site (and capacity is therefore added).

Signals thus received are coupled through circulator 43 and bandpass filter 29 and through path 28 which consists of an UHF portion 36, baseband link 38/40, and a radio frequency portion 42. The output of radio frequency portion 42 is coupled through circulators 44 and 56 and transmitted across link 15 to cell site transceiver 14.

One embodiment of the invention includes diversity reception. This is shown in FIG. 2 beginning with antenna 31. Operation of the signal path, including bandpass filter 32 and path 30 (consisting of UHF portion 46, baseband link 48/50, and radio frequency portion 52) is identical to that of the receive path described above. Diversity reception is well understood in the art and is not discussed in greater detail herein.

The illustrated embodiment of the invention includes a synchronization means 34 for impressing a synchronizing signal upon the remote cellular signal during its processing along the signal path. This signal is decoded at the receiving end of link 15 (in this example, the cell site transceiver) to provide for accurate registration and alignment of the signal within its corresponding signal frame and to assure that each transmitter portion of the invention operates in a coordinated fashion with each corresponding receiver portion of the invention.

At cell site transceiver 14, signals propagated across link 15 from remote site transceiver 20 are coupled through circulators 58 and 60 along receive paths 62 and 64. Each receive path corresponds to one of the diversity reception paths at the remote site transceiver.

Operation of both paths is identical and the following discussion will only address path 62 with corresponding designators for the other path appearing in parenthesis. Radio frequency stage 66 (74) processes the signal and routes it to baseband link 68/70 (76/78). Thereafter the signal is converted to the standard cellular UHF band at UHF stage 72 (80) and coupled to the master cell site equipment and controller through terminal 71 (79).

Signals routed from the telephone system to a remote subscriber are coupled by controller 17 to cell site transceiver 14 at terminal 83. These signals are routed along path 85 consisting of an UHF portion 84 operating in the cellular band, a baseband portion 86/88, and a radio frequency portion 90. The radio frequency signal is coupled through circulator 58 and propagated to remote cell site transceiver 20 over link 15.

In the illustrated embodiment of the invention, a synchronization pilot signal is introduced at point 82 to provided for registration and alignment of the cellular signal within an appropriate frame.

Signals received at remote cell site transceiver 20 are coupled through circulator 56 to path 93, which consists of a radio frequency portion 91, a baseband portion 92/94, and an UHF portion 96. The UHF signal thus produced is amplified by amplifier stages 98 and 99 and coupled through circulator 43 to antenna 26 for broadcast to the mobile cellular subscriber. Synchronization information encoded at the time of transmission from transceiver 14 is decoded at synchronizer stage 95 and signal accuracy and integrity is thus assured.

Figure 3:
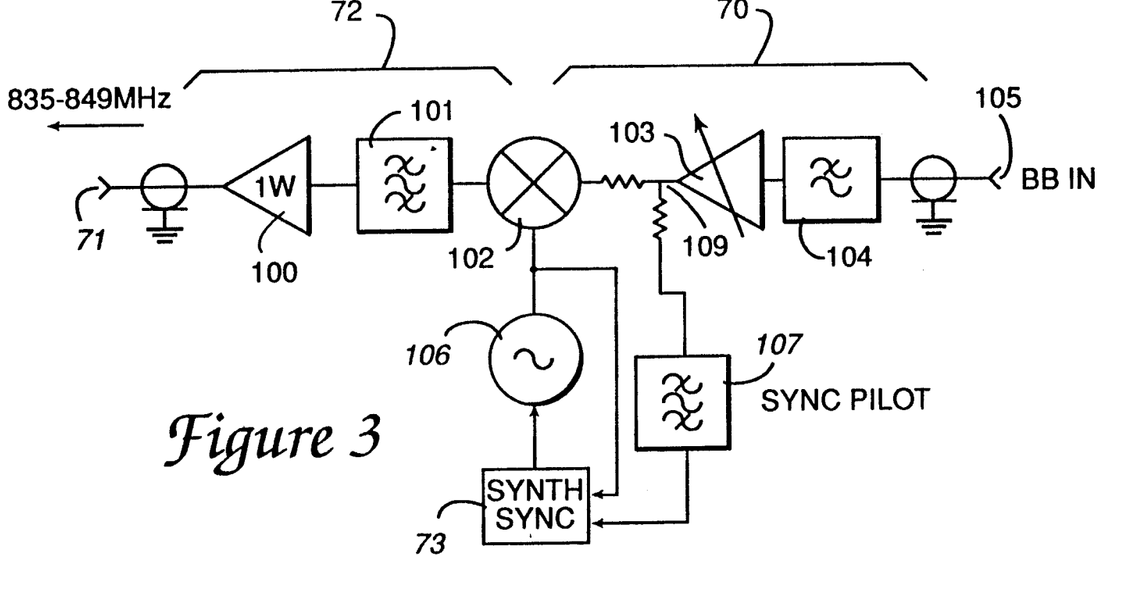
FIG. 3 is a detailed block level diagram, showing a cell site receive up converter portion of an illustrative embodiment of the present invention.

Referring to FIG. 3, a detailed block diagram of a cell site up-converter is shown. The up-converter consists of a baseband signal path 70 and a cellular band UHF radio frequency path 72.

A baseband signal corresponding to a remote signal from a mobile subscriber is coupled through terminal 105 and lowpass filter 104 to amplifier 103. The output of amplifier 103 is divided at said node and a portion of the signal present at node 109 is directed to bandpass filter 107 to derive a synchronization pilot signal which is used to lock local oscillator 106. Another portion of the signal present at node 109 is coupled to mixer 102. Local oscillator 106 is also coupled to mixer 102 and the resulting signal, thus heterodyned to a cellular band UHF radio frequency signal, is coupled through bandpass filter 101 to output amplifier 100 and thereafter, via terminal 71 to the master cell site transceiver (receiver portion) equipment, e.g. controller 17.

Figure 4:
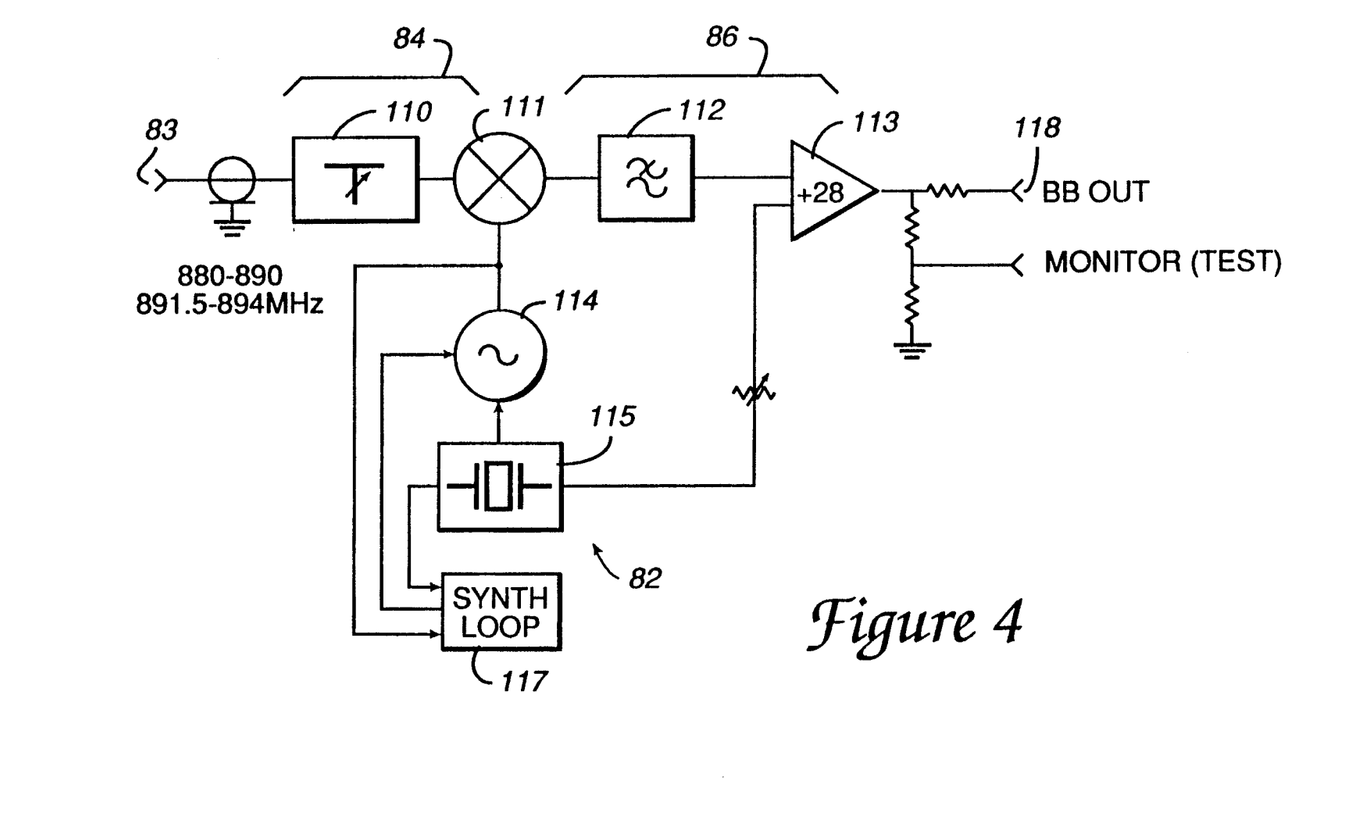
FIG. 4 is a detailed block level diagram, showing a cell site transmit down converter portion of an illustrative embodiment of the present invention.

Referring to FIG. 4, a detailed block diagram of a cell site down-converter is shown. The down-converter consists of a baseband signal path 86 and a cellular band radio frequency path 84.

Telephone information from the master cell site/controller UHF transmitter is coupled through terminal 83 and via level adjusting attenuator 110 to mixer 111. A synchronization pilot circuit 82 includes a crystal frequency standard 115 coupled to a synthesis loop 117. A local oscillator 114 is also coupled to the synthesis loop and a pilot synchronization signal is thus derived. Local oscillator 114 is coupled to mixer 111 and the heterodyned output baseband signal is routed through lowpass filter 112 to one terminal of amplifier 113. The other terminal of amplifier 113 receives the pilot synchronization signal. The combined signals are output from amplifier 113 via terminal 118 to a transmitter portion of the cell site microwave link transceiver.

Figure 5:
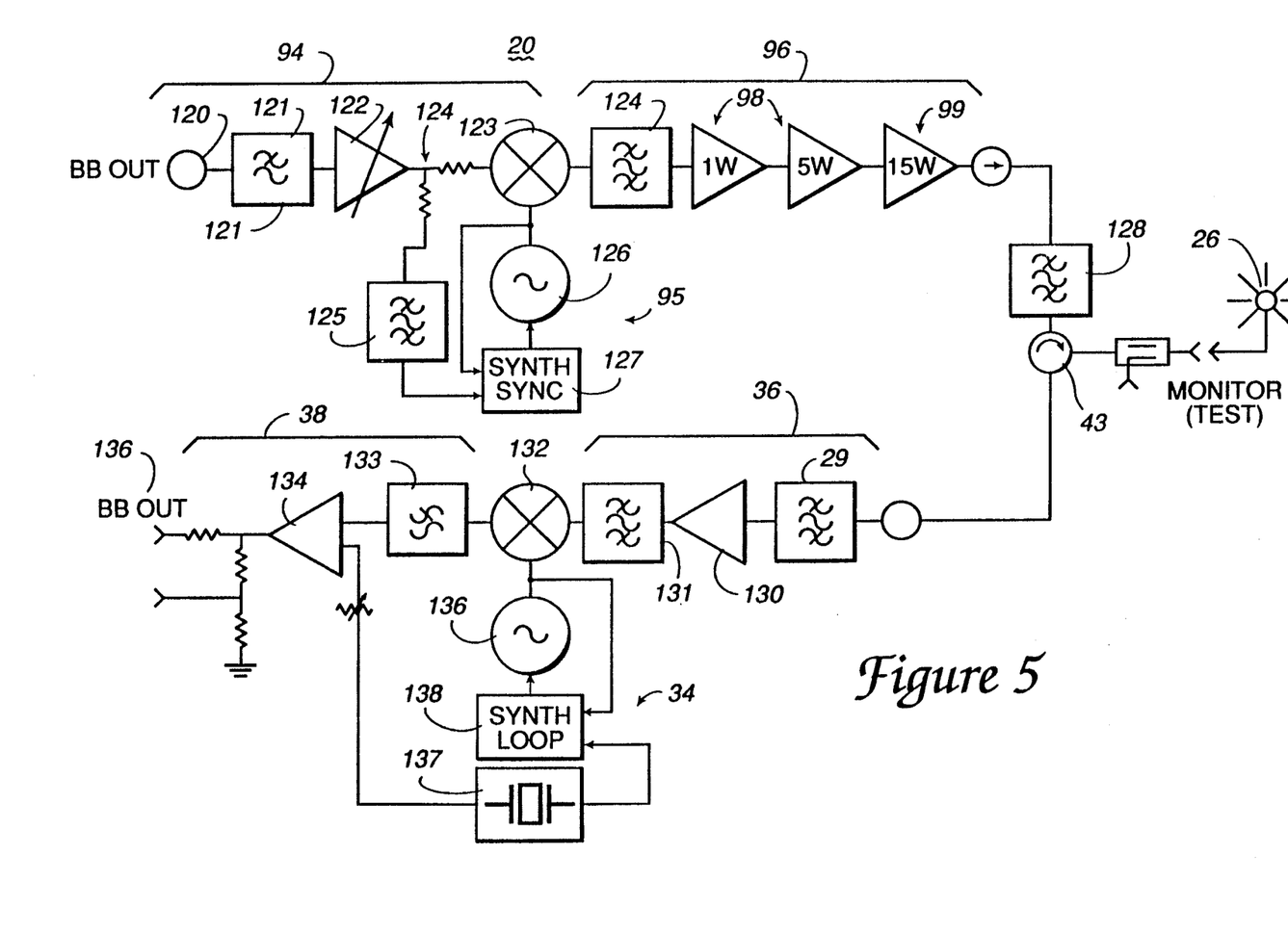
FIG. 5 is a detailed block level diagram, showing a remote site up and down converter portion of an illustrative embodiment of the present invention.

Operation of the remote site transceiver is similar to that of the cell site transceiver and is best understood by referring to FIG. 5. A baseband signal is coupled through baseband path 94 and cellular band radio frequency path 96 to provide a signal for reception at the mobile subscriber unit.

The baseband signal recovered from the cell site signal is coupled via terminal 120 through low pass filter 121 and amplifier 122 to node 129. A portion of the signal presented to node 129 is coupled to mixer 123; another portion of the signal at node 129 is coupled through bandpass filter 125 to a synthesis loop portion 127 of synchronization circuit 95. The portion of baseband signal presented to the synthesis loop is used to produce a difference signal that locks local oscillator 126 to the pilot synchronization signal encoded into the signal during transmission from the cell site.

The local oscillator and baseband signals are heterodyned at mixer 123 and a cellular band UHF radio frequency signal is thus produced. This signal is coupled through bandpass filter 124 to linear amplifier stage 98 and, thereafter, to output linear amplifier 99. The power level of each of these amplifiers is a matter of choice and, in the illustrated embodiment of the invention, it is 1, 5, and 15 watts respectively.

The output signal is coupled through bandpass filter 128 and circulator 43 to antenna 26 for transmission to the mobile subscriber.

Signals received from the mobile subscriber at antenna 26 are coupled through circulator 43 to cellular band radio frequency path 36 and, after processing, to baseband path 38.

The subscriber signal is routed through bandpass filter 29, low noise amplifier 130, and bandpass filter 131 to mixer 132. A signal from local oscillator 136 is also presented to mixer 132 and the resulting heterodyned signal in the baseband is coupled through lowpass filter 133 to an input of amplifier 134.

Synchronization circuit 34 includes a synthesis loop 138 and a crystal frequency standard 137 for locking operation of local oscillator 136. A signal derived from crystal 137 is presented to another input of amplifier 134 and the amplifier's output thus includes a signal portion and an encoded pilot portion, both of which are coupled through terminal 135 for transmission to the cell site transceiver.

Figure 6:
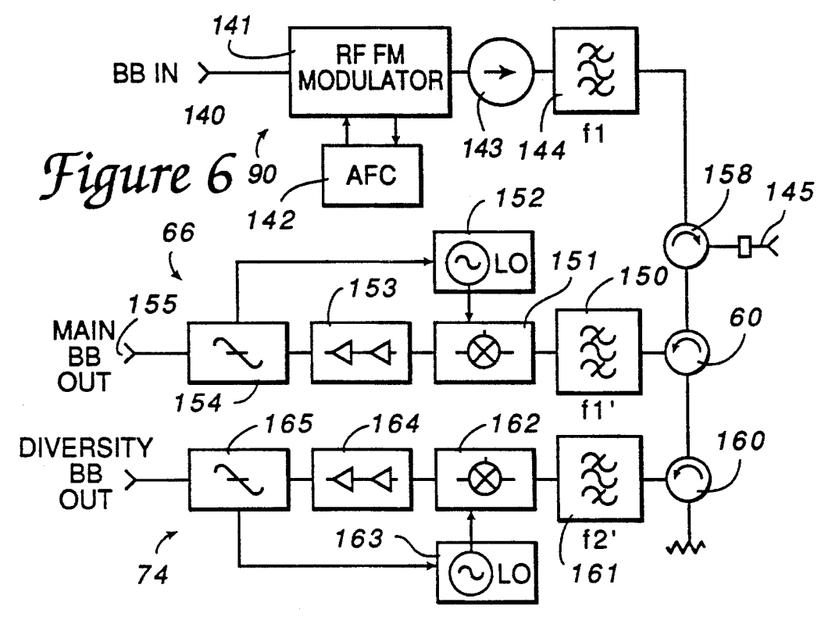
FIG. 6 is a detailed block diagram, showing a cell site microwave equipment portion of an illustrative embodiment of the present invention.
Figure 7:
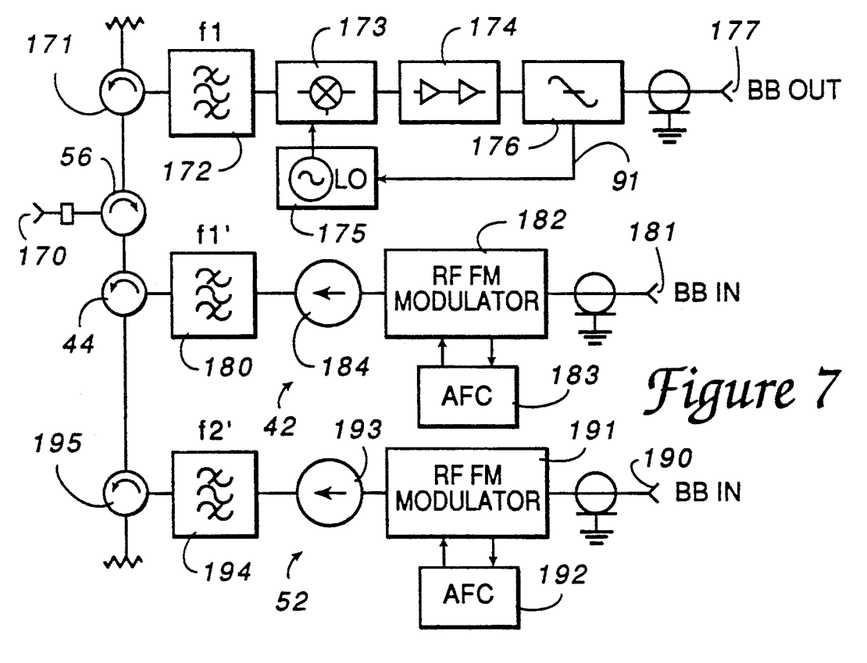
FIG. 7 is a detailed block diagram, showing a remote site microwave equipment portion of an illustrative embodiment of the present invention.

Operation of the baseband/radio frequency link portion of the invention is best understood by referring to FIGS. 6 and 7. FIG. 6 is a block diagram of the baseband/radio frequency link portion of the cell site transceiver.

Telephone signals from the master cell site/controller/UHF transceiver are coupled through terminal 140 along baseband path 90 to a radio frequency FM modulator 141. An automatic frequency control circuit 142 assures stability of the resulting frequency modulated radio frequency signal.

The modulated signal is coupled through circulator 143 and bandpass filter 144 to circulator 58 and, thereafter, to terminal 145.

Signals from the remote site transceiver are presented through terminal 145 and circulators 58 and 60 to bandpass filter 150. In the illustrated embodiment of the invention, provision is made for diversity reception. Accordingly, a second circulator 160 is included through which the remote site signals is presented to bandpass filter 161. For purposes of this discussion, only the main receiver path is discussed with the corresponding diversity path element indicated in parenthesis. Operation of the two paths is otherwise identical.

From bandpass filter 150 (161), the signal is coupled to mixer 151 (162). The output of a local oscillator 152 (163) is also coupled to mixer 151 (162) and the heterodyned output of the mixer is coupled through amplifier 153 (164) and FM demodulator 154 (165) as a baseband output signal via terminal 155 (166).

A portion of the signal is derived from FM demodulator 154 (165) and fed back to local oscillator 152 (163) to lock the oscillator to the received microwave carrier frequency (standard automatic frequency control loop).

FIG. 7 is a block diagram of a link frequency/baseband portion of the remote site transceiver. Telephone information (and a pilot signal) from the cell site transceiver is coupled from terminal 170 through circulators 56 and 171 to a radio frequency path 91. The link radio frequency signal is coupled through bandpass filter 172 to mixer 173. A local oscillator 175 signal is also coupled to mixer 173 and the heterodyned output signal is the intermediate frequency signal.

The intermediate frequency signal is coupled through amplifier 174 and FM demodulator 176 where the baseband signal is recovered. The baseband signal is then coupled to terminal 177 from which it is routed to the baseband/cellular band radio frequency converter for transmission to a mobile subscriber.

As previously mentioned, diversity reception is an option that is included in the illustrated embodiment of the invention. The following discussion of the baseband/link radio frequency path will be directed to the main receive path with corresponding elements of the diversity path designated in parenthesis.

The baseband signal analog of the mobile subscriber signals, i.e. the composite of all channels, is coupled through terminal 181 (190) to radio frequency FM modulator 182 (191). The baseband signal is thus impressed on the radio frequency and the resulting modulated signal is coupled through isolator 184 (193) to bandpass filter 180 (194) and thence through circulators 44 (195) and 56 to terminal 170 as the link frequency signal. An automatic frequency control circuit 183 (192) is included to assure stability.

Thus, the present invention solves the problem of adding capacity to a cellular system at minimal cost without signal or performance degradation. In this way the reusable frequency spectrum is extended without the need to increase the number of cell site installations.

While the invention has been particularly shown and described with reference to an illustrative embodiment, detailing the best known mode presently known for practicing the invention, it will be understood by those skilled in the art that various other modifications and changes may be made to the present invention described above without departure from the spirit and scope thereof. In particular, but not by way of limitation, the present invention includes the method by which cell site capacity is increased as well as the illustrated apparatus, as well as all equivalents of the elements shown in the illustrative embodiment.

We claim:

1. In a cellular system including at least one cell site located within a corresponding geographic sector, an apparatus for expanding cellular system capacity, comprising:
 a cell site transceiver, located proximate to said cell site, said cell site transceiver comprising:
 a) a first receiver for receiving a cell site cellular band signal directly coupled from said cell site;
 b) a first converter for converting said cell site cellular band signal to a first link frequency signal;
 c) a first transmitter for transmitting said first link frequency signal;
 d) a second receiver for receiving a second link frequency signal;
 e) a second converter for converting said second link frequency signal to a remote cellular band signal; and
 f) a second transmitter for transmitting said remote cellular band signal to said cell site; and
 a remote site transceiver, located at a remote site from said cell site within said geographic sector, said remote site transceiver comprising:
 a) a first receiver for receiving said remote cellular band signal;
 b) a first converter for converting said remote cellular band signal to said first link frequency signal;
 c) a first transmitter for transmitting said first link frequency signal to said cell site transceiver;
 d) a second receiver for receiving said second link frequency signal from said cell site transceiver;
 e) a second converter for converting said second link frequency signal to said cell site cellular band signal; and
 f) a second transmitter for transmitting said cell site cellular band signal,
 whereby subdivision of said geographic sector is accomplished thereby effecting expanded cellular system capacity.

2. The apparatus of claim 1, wherein said cell site transceiver and said remote site transceiver further comprise:
 a pilot signal for synchronizing and registering operation of said cell site transceiver and said remote site transceiver with one another.

3. The apparatus of claim 1, wherein said geographic sector includes a corresponding allocation of communications channels and wherein a first portion of said communications channels are assigned to said cell site and a remaining portion of said communications channels are assigned to said remote site.

4. The apparatus of claim 1, wherein said remote site transceiver includes at least two receivers for receiving said remote cellular band signal to provide diversity reception.

5. The apparatus of claim 1, further comprising a plurality of remote site transceivers.

6. The apparatus of claim 1, wherein said first and second link frequency signals are microwave signals.

7. In a cellular system including at least one cell site located within a corresponding geographic sector, an apparatus for expanding cellular system capacity, comprising:
 a cell site transceiver, located proximate to said cell site, said cell site transceiver comprising:
 a) a first receiver for receiving a cell site cellular band signal directly coupled from said cell site;
 b) a first converter for converting said cell site cellular band signal to a first baseband signal;
 c) a second converter for converting said first baseband signal to a first link frequency signal;
 d) a first transmitter for transmitting said first link frequency signal;
 e) a second receiver for receiving a second link frequency signal;

f) a third converter for converting said second link frequency signal to a second baseband signal;

g) a fourth converter for converting said second baseband signal to a remote cellular band signal; and h) a second transmitter for transmitting said remote cellular band signal to said cell site; and a remote site transceiver, located at a remote side from said cell site within said geographic sector, said remote site transceiver comprising:

a) a first receiver for receiving said remote cellular band signal;

b) a first converter for converting said remote cellular band signal to a third baseband signal;

c) a second converter for converting said third baseband signal to said first link frequency signal;

d) a first transmitter for transmitting said first link frequency signal to said cell site transceiver;

e) a second receiver for receiving said second link frequency signal from said cell site transceiver;

f) a third converter for converting said second link frequency signal to a fourth baseband signal;

g) a fourth converter for converting said fourth baseband signal to said cell site cellular band signal; and h) a second transmitter for transmitting said cell site cellular band signal, whereby subdivision of said geographic sector is accomplished thereby effecting expanded cellular system capacity.

8. The apparatus of claim 7, wherein said cell site transceiver and said remote site transceiver further comprise:

a pilot signal for synchronizing and registering operation of said cell site transceiver and said remote site transceiver with one another.

9. The apparatus of claim 7, wherein said geographic sector includes a corresponding allocation of communications channels and wherein a first portion of said communications channels are assigned to said cell site and a remaining portion of said communications channels are assigned to said remote site.

10. The apparatus of claim 7, wherein said remote site transceiver includes at least two receivers for receiving said remote cellular band signal to provide diversity reception.

11. The apparatus of claim 7, further comprising a plurality of remote site transceivers.

12. The apparatus of claim 7, wherein said first and second link frequency signals are microwave signals.

13. In a cellular system including at least one cell site located within a corresponding geographic sector, an apparatus for expanding cellular system capacity, comprising:

a cell site transceiver, located proximate to said cell site, said cell site transceiver comprising:

a) a first receiver for receiving a cell site cellular band signal directly coupled from said cell site;

b) a first converter for converting said cell site cellular band signal to a first link frequency signal;

c) a first transmitter for transmitting said first link frequency signal to a remote site transceiver;

d) a second receiver for receiving a second link frequency signal from said remote site transceiver;

e) a second converter for converting said second link frequency signal to a remote cellular band signal; and f) a second transmitter for transmitting said remote cellular band signal to said cell site, whereby subdivision of said geographic sector is accomplished thereby effecting expanded cellular system capacity.

14. In a cellular system including at least one cell site located within a corresponding geographic sector, a method for expanding cellular system capacity, comprising the steps of:

at a cell site transceiver, located proximate to said cell site:

a) receiving a cell site cellular band signal directly coupled from said cell site;

b) converting said cell site cellular band signal to a first baseband signal;

c) converting said first baseband signal to a first link frequency signal;

d) transmitting said first link frequency signal to a remote site transceiver;

e) receiving a second link frequency signal from said remote site transceiver;

f) converting said second link frequency signal to a second baseband signal;

g) converting said second baseband signal to a remote cellular band signal; and h) transmitting said remote cellular band signal to said cell site; and at a remote site transceiver, located at a remote site from said cell site within said geographic sector:

a) receiving said remote cellular band signal;

b) converting said remote cellular band signal to a third baseband signal;

c) converting said third baseband signal to said first link frequency signal;

d) transmitting said first link frequency signal to said cell site transceiver;

e) receiving said second link frequency signal from said cell site transceiver;

f) converting said second link frequency signal to a fourth baseband signal;

g) converting said fourth baseband signal to a cell site cellular band signal; and h) transmitting said cell site cellular band signal, whereby subdivision of said geographic sector is accomplished thereby effecting expanded cellular system capacity.

15. The method of claim 14, comprising:

synchronizing and registering operation of said cell site transceiver and said remote site transceiver with one another.

16. The method of claim 14, wherein said geographic sector includes a corresponding allocation of communications channels, the further steps of:

assigning a first portion of said communications channels to said cell site, and assigning a remaining portion of said communications channels to said remote site.

17. The method of claim 14, further comprising the step of:

subdividing said geographic sector with a plurality of remote site transceivers.

18. The method of claim 14, further comprising the step of:

propagating said first and said second link frequency signals at a microwave frequency.

19. In a cellular system including at least one cell site located within a corresponding geographic sector, an apparatus for expanding cellular system capacity, comprising:

a remote site transceiver, located remote from said cell site, said remote site transceiver comprising:

a) a first receiver for receiving a remote site cellular band signal;

b) a first converter for converting said remote site cellular band signal to a first link frequency signal;

c) a first transmitter for transmitting said first link frequency signal to a cell site transceiver;

d) second receiver for receiving a second link frequency signal from said cell site transceiver;

e) a second converter for converting said second link frequency signal to a cell site cellular band signal; and f) a second transmitter for transmitting said cell site cellular band signal;

whereby subdivision of said geographic sector is accomplished thereby effecting expanded cellular system capacity.

* * * * *